(12) United States Patent
Martch

(10) Patent No.: US 12,323,662 B2
(45) Date of Patent: Jun. 3, 2025

(54) SYSTEMS AND METHODS FOR FACILITATING CONTENT ADAPTATION TO ENDPOINTS

(71) Applicant: DISH Network L.L.C., Englewood, CO (US)

(72) Inventor: Henry Gregg Martch, Parker, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 17/902,176

(22) Filed: Sep. 2, 2022

(65) Prior Publication Data
US 2024/0080526 A1    Mar. 7, 2024

(51) Int. Cl.
*H04N 21/439* (2011.01)
*H04N 21/44* (2011.01)
*H04N 21/462* (2011.01)

(52) U.S. Cl.
CPC .......... *H04N 21/462* (2013.01); *H04N 21/439* (2013.01); *H04N 21/44008* (2013.01)

(58) Field of Classification Search
CPC ............... H04N 21/462; H04N 21/439; H04N 21/44008
USPC ........................................................ 725/131
See application file for complete search history.

(56) References Cited

U.S. PATENT DOCUMENTS

| | | | | |
|---|---|---|---|---|
| 7,647,417 B1* | 1/2010 | Taneja | ..................... | H04L 67/02 709/230 |
| 9,405,741 B1* | 8/2016 | Schaaf | ..................... | G10L 13/00 |
| 2006/0130121 A1* | 6/2006 | Candelore | .......... | H04N 21/8541 725/115 |
| 2008/0040226 A1* | 2/2008 | Roker | ..................... | H04L 67/306 705/14.66 |
| 2014/0304373 A1* | 10/2014 | Tarbox | ..................... | H04L 65/60 709/219 |
| 2015/0070516 A1* | 3/2015 | Shoemake | ......... | H04N 21/4542 348/207.11 |
| 2022/0295131 A1* | 9/2022 | Shah | ................... | H04N 21/8456 |
| 2022/0414676 A1* | 12/2022 | Power | ..................... | H04L 63/18 |

* cited by examiner

*Primary Examiner* — Alfonso Castro
(74) *Attorney, Agent, or Firm* — Kilpatrick Townsend & Stockton LLP

(57) ABSTRACT

Systems, media devices, machine-readable media, and methods facilitate content adaptation to endpoints. First content that includes audio content and video content may be received. An adaptation protocol may be detected as applying to the first content based at least in part on one or more of a destination specification and/or an endpoint specification identified for the first content. The first content may be analyzed based at least in part on the adaptation protocol. A portion of the first content that has a content characteristic specified by the adaptation protocol may be determined. A set of rules governing content modification in accordance with the adaptation protocol may be identified. The first content may be modified in accordance with the adaptation protocol and the set of rules. The modified first content may be transferred so that the modified first content is accessible with an endpoint media device.

17 Claims, 4 Drawing Sheets ns, of the present disclosure.

SYSTEMS AND METHODS FOR FACILITATING CONTENT ADAPTATION TO ENDPOINTS

This disclosure generally relates to content handling, and more particularly to systems and methods for facilitating content adaptation to endpoints.

BACKGROUND

The evolution of video and non-video content generation and delivery may present a number of challenges and problems for media control. The proliferation of video from non-traditional sources, much of it user-generated and live-generated (e.g., livestreams, YouTube, TikTok, etc.), makes up an increasing share of screen time for most, if not all, types of users. Conventional platforms typically do not provide adequate control that keeps up with the video and non-video content generation and delivery with sufficient monitoring, data inspection, and control.

Thus, there is a need for systems and methods that address the foregoing problems. This and other needs are addressed by the present disclosure.

BRIEF SUMMARY

Certain embodiments of the present disclosure relate generally to content handling, and more particularly to systems and methods for facilitating content adaptation to endpoints.

In one aspect, a system to facilitate content adaptation to endpoints is disclosed. The system may include one or more processing devices and memory communicatively coupled with and readable by the one or more processing devices and having stored therein processor-readable instructions which, when executed by the one or more processing devices, cause the one or more processing devices to perform operations including one or a combination of the following. First content that includes audio content and video content may be received. An adaptation protocol may be detected as applying to the first content based at least in part on one or more of a destination specification and/or an endpoint specification identified for the first content. The first content may be analyzed based at least in part on the adaptation protocol. A portion of the first content that has a content characteristic specified by the adaptation protocol may be determined. A set of rules governing content modification in accordance with the adaptation protocol may be identified. The first content may be modified in accordance with the adaptation protocol and the set of rules. The modified first content may be transferred so that the modified first content is accessible with an endpoint media device.

In yet another aspect, one or more machine-readable storage devices for storing machine-executable instructions are disclosed. The machine-executable instructions, when executed by one or more processing devices, cause the one or more processing devices to perform one or a combination of the following operations. First content that includes audio content and video content may be received. An adaptation protocol may be detected as applying to the first content based at least in part on one or more of a destination specification and/or an endpoint specification identified for the first content. The first content may be analyzed based at least in part on the adaptation protocol. A portion of the first content that has a content characteristic specified by the adaptation protocol may be determined. A set of rules governing content modification in accordance with the adaptation protocol may be identified. The first content may be modified in accordance with the adaptation protocol and the set of rules. The modified first content may be transferred so that the modified first content is accessible with an endpoint media device.

In yet another aspect, a method to facilitate content adaptation to endpoints is disclosed. The method may include one or a combination of the following. First content that includes audio content and video content may be received. An adaptation protocol may be detected as applying to the first content based at least in part on one or more of a destination specification and/or an endpoint specification identified for the first content. The first content may be analyzed based at least in part on the adaptation protocol. A portion of the first content that has a content characteristic specified by the adaptation protocol may be determined. A set of rules governing content modification in accordance with the adaptation protocol may be identified. The first content may be modified in accordance with the adaptation protocol and the set of rules. The modified first content may be transferred so that the modified first content is accessible with an endpoint media device.

In various embodiments, the modifying the first content may include editing a video portion of the first content that corresponds to the portion of the first content that has the content characteristic. In various embodiments, the modifying the first content may include editing an audio portion of the first content that corresponds to the portion of the first content that has the content characteristic. In various embodiments, the modifying the first content may include adding tag data corresponding to the portion of the first content that has the content characteristic. In various embodiments, the modifying the first content in accordance with the adaptation protocol and the set of rules may be based at least in part on control specifications received via a user interface associated with the endpoint media device. In various embodiments, the modifying the first content in accordance with the adaptation protocol and the set of rules may be based at least in part on crowdsourced data from a plurality of content receivers. In various embodiments, the crowdsourced data may be collected from the plurality of content receivers. The crowdsourced data may be indicative of one or more playback control operations made with each content receiver of the plurality of content receivers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Figure 1:
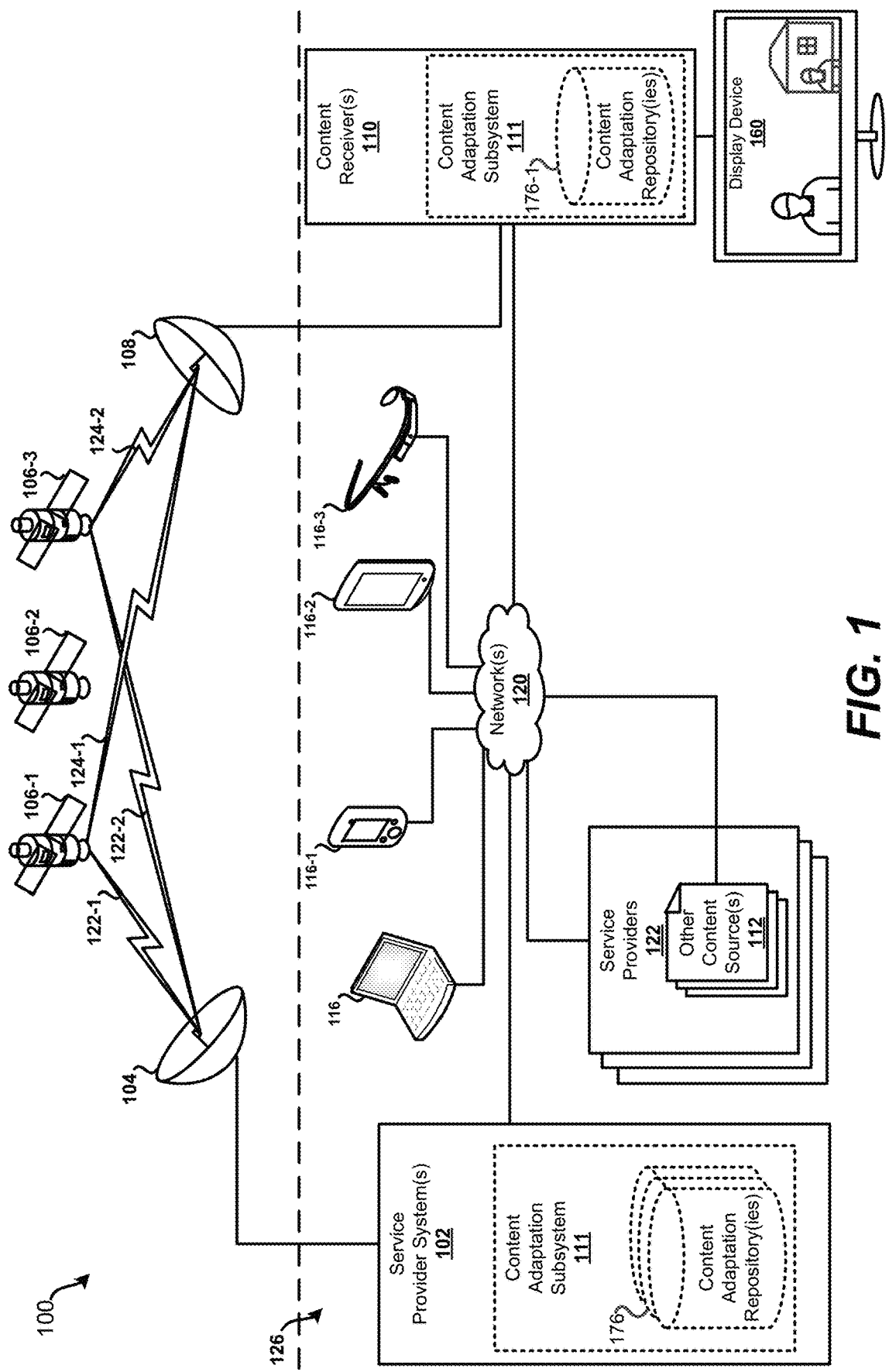
FIG. 1 illustrates a content distribution system, in accordance with disclosed embodiments according to the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or messages in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

The endpoint devices 116 may, by way of example, include smartphones, tablet computers, television receivers, smart glasses or other similar forms of wearable computing devices, laptop computers, desktop/PC computers, home servers, smart speakers, display devices, smart radios, gaming consoles, vehicle computers, and/or one or more other I/O devices to facilitate local user interfaces configured to facilitate and/or implement security and control features disclosed herein. Many embodiments may include a large number of content provider systems 102, service provider systems 122, content sources 112, and/or such media devices. The one or more content provider systems 102 may include one or more online gaming service provider systems (e.g., systems facilitating online, multiplayer gaming such as Steam, Epic Games, Xbox, PlayStation, etc.), live-generated and/or on-demand audio video streaming, sharing, and/or social networking systems (e.g., Twitch, YouTube, TikTok, and/or the like), service provider system systems, and/or the like. The content provider systems 102 may transmit data to the endpoint devices 116 via one or more networks of the networks 120.

The system 100 may include one or more service provider systems 102, one or more satellite uplinks 104, a plurality of orbiting (e.g., geosynchronous) satellites 106, one or more satellite receivers 108, one or more content receivers 110, one or more contents sources 112 (e.g., online content sources), one or more (other) television receivers 110-1, one or more computing devices 116, and/or one or more other service provider systems 122. The service provider system 102 may correspond to a television service provider system in some embodiments. In some embodiments, the service provider system 102 may include a content adaptation subsystem 111. Additionally or alternatively, one or more service provider systems 122 may include the content adaptation subsystem 111. Additionally or alternatively, the content receiver 110 may include the content adaptation subsystem 111. In various embodiments, various features of the content adaptation subsystem 111 may be distributed, for example, among the service provider system 102 and one or more of the content receivers 110. The content adaptation subsystem 111 may be configured to facilitate various content processing and editing/splicing features in accordance with various embodiments disclosed herein.

The service provider system 102 and/or the content receiver 110 may include one or more content adaptation repositories 176, in which particularized content items may be stored. The one or more content adaptation repositories 176 may be implemented in various ways. For example, the one or more content adaptation repositories 176 may correspond to local storage media of the content receiver 110. One or more data processing systems may store particularized content items. One or more relational or object-oriented databases, or flat files on one or more computers or networked storage devices, may store particularized content items. In some embodiments, a centralized system stores particularized content items; alternatively, a distributed/cloud system, network-based system, such as being implemented with a peer-to-peer network, or Internet, may store particularized content items.

The service provider system 102 and satellite transmitter equipment (which may include the satellite uplink 104) may be operated by a television service provider. A service provider system may distribute television channels, on-demand programing, programming information, and/or other services to users via satellite. The service provider system 102 may receive feeds of one or more television channels from various sources. Such television channels may include multiple television channels that contain the same content. To distribute such television channels to users, feeds of the television channels may be relayed to user equipment via one or more satellites in the form of transponder streams. Satellite transmitter equipment may be used to transmit a feed of one or more television channels from the service provider system 102 to one or more satellites 106. While a single service provider system 102 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

In various embodiments, the content receivers 110 may generally be any type of television receiver (such as an STB (set-top box), for example) configured to decode signals received for output and presentation via a display device 160. In various embodiments, the content receiver 110 (which may include a television receiver) may be integrated as part of or into a television, a DVR, a computing device 116, such as a tablet computing device 116-2, or any other computing system or device 116, as well as variations thereof. In various embodiments, the content receiver 110 may include, be, or otherwise correspond to one or more computing devices 116. In some embodiments, the content receivers 110 may include one or more routers that may be configured to router traffic to/from and communicate with a plurality of endpoint media devices 116 and that may include any suitable routers, switches, modems, wireless transceivers, wired ports, etc. In some embodiments, a content receiver 110 may be a component that is added into the display device 160, such as in the form of an expansion card. In various embodiments, the one or more content receivers 110 may include any suitable wireless transceivers, wired ports, etc., one or more processors, and input-output (I/O) interfaces, and one or more types of memory, with an operating system and instructions stored in non-transitory memory such that the one or more content receivers 110 may be configured to function as a special-purpose computer to provide one or more content adaptation subsystem 111 features in accordance with various embodiments disclosed herein.

A content receiver 110 and network 120 together with television receivers 110 and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 160, computing devices 116, etc. are illustrated in FIG. 1, it should be understood that multiple (e.g., tens, thousands, millions) instances of such equipment, corresponding to various users in various geolocations, may be included the system 100.

In some embodiments, broadcast television programs may be delivered to television receivers, including a content receiver 110, via satellite according to a schedule. On-demand content may also be delivered to a content receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by service provider system 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the service provider system 102 via the satellites 106. For example, the satellite receiver 108 may be configured to receive particular transponder streams as downlink signals 124, from one or more of the satellites 106. Based at least in part on the characteristics of a given content receiver 110 and/or satellite receiver 108, it may only be possible to capture transponder streams from a limited number of transponders of the satellites 106 concurrently. For example, a tuner of the content receiver 110 may only be able to tune to a single transponder stream from a transponder of a single satellite, such as the satellite 106-1, at a time.

The content receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at the content receiver 110. For example, an HD channel may be output to a television by the content receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The content receiver 110 may select via tuner, decode, and relay particular transponder streams to one or more of television receivers 110, which may in turn relay particular transponder streams to one or more display devices 160. For example, the satellite receiver 108 and the content receiver 110 may, respectively, be configured to receive, decode, and relay at least one television channel to a television by way of a content receiver 110. Similar to the above example, a television channel may generally be presented "live" or from a recording as previously stored by the content receiver 110, and may be output to the display device 160 by way of the content receiver 110 in accordance with a particular content protection technology and/or networking standard. Other embodiments are possible.

In various embodiments, the content resources 126 may be used to provide the content receiver 110 with content (e.g., television programming). The content resources 126 may be used to retrieve television programs or portions of television programs following and/or during a live broadcast of the television programs. The content resources 126 may include the service provider system 102, the service providers 122, the other content sources 112 (e.g., online content sources), one or more other television receivers, and/or the like. The service provider system 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the service provider system 102 via the network 120. For instance, the service provider system 102 may be permitted to transmit a portion of a television program or an entire television program during and/or after a time at which the television program was broadcast live by the service provider system via a satellite-based television programming distribution arrangement.

In some embodiments, the service provider system 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the content receiver 110, a user of the content receiver 110 may at least need to agree to payment of the fee. On-demand content provided via the satellite-based distribution arrangement may be stored locally by the content receiver 110 to allow on-demand access. On-demand content may also be retrieved via the network 120 from the service provider system 102.

The computing devices 116 represent various computerized devices that may be associated with a user of the content receiver 110 and that may be configured to facilitate various content discovery features disclosed in various embodiments herein. As indicated by 116, the computing devices 116 may include a laptop computer, a desktop computer, a home server, or another similar form of computerized device. As indicated by 116-1 and 116-2, the computing devices 116 may include a cellular phone and/or smartphone, a tablet computer, or another similar form of mobile device. As indicated by 116-3, the computing devices 116 may include smart glasses or another similar form of wearable computing device.

In some embodiments, the content sources 112 (e.g., online content sources) may represent content resources through which television programs may be retrieved by the content receiver 110 via the network 120. Television programming available through the content sources 112 may be available for free and not require subscription (a username and/or password may or may not be necessary). Each of the content sources 112 may represent different websites available via the Internet. For example, some television programming may be legally made available for free (such as television programming provided by government-funded sources, e.g., the BBC or Hulu®). Periodically, the content receiver 110 may poll content sources 112 to determine which television programs are available and/or which television programs are scheduled to be available in the future. In some embodiments, the content receiver 110 may poll content sources 112 regarding the availability of at least a portion of a specific television program.

While FIG. 1 illustrates aspects of a satellite-based television channel distribution system, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems. Thus, while network configuration data may be broadcast repeatedly via satellite to television receivers, it should be understood that a similar arrangement may be used in cable-based television programming broadcast networks to broadcast network configuration. For either type of network, various other forms of data may be transmitted via an Internet-based network 120 connection rather than using the television service provider's proprietary network.

Figure 2:
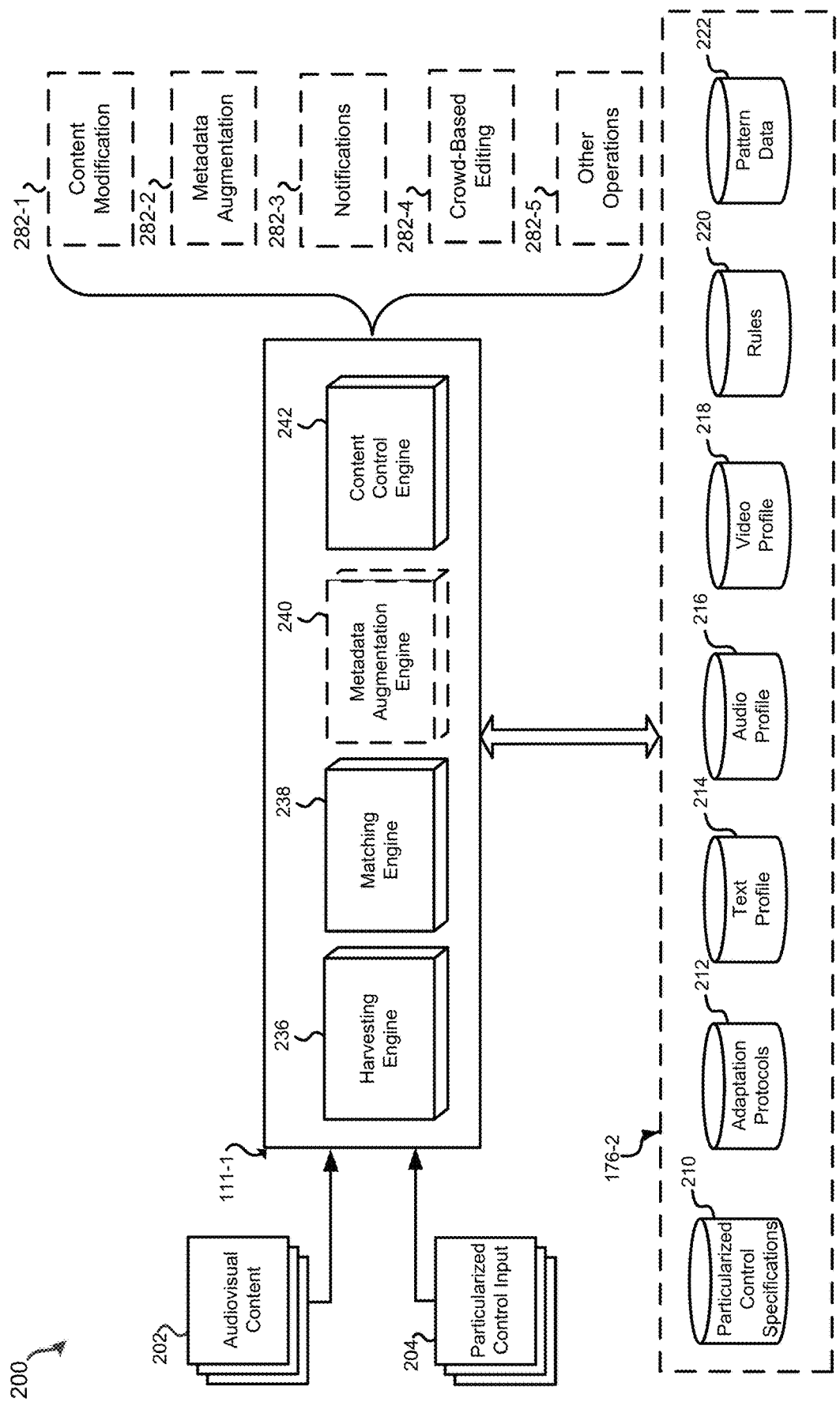
FIG. 2 illustrates a functional diagram of a content adaptation system, in accordance with disclosed embodiments according to the present disclosure.

FIG. 2 illustrates a functional diagram of a content adaptation system 200, in accordance with embodiments according to the present disclosure. In some embodiments, the content adaptation system 200 may be included in the service provider system 102 and/or one or more other service providers 122. As depicted, the content adaptation system 200 includes a content adaptation subsystem 111. In some embodiments, the content adaptation system 200 may be separate from, and provide content to, the service provider system 102. In some embodiments, the content adaptation system 200 may be included in the end-user system and may be included in the one or more content receivers 110. In some embodiments, various features of the content adaptation system 200 may be distributed among the one or more content receivers 110 (e.g., router and/or endpoint computing device 116) and upstream of the one or more content receivers 110.

In various embodiments, for example, certain operations disclosed herein (e.g., audio processing, text processing, video processing, corresponding recognition processes, comparison of the audiovisual content 202 to audio, video, and/or text profiles, etc.) may be performed in the cloud (e.g., the content provider system 102) when available bandwidth, latency, and/or processing times are determined by the subsystem 111 to meet corresponding bandwidth, latency, and/or processing time thresholds (which may be predetermined by default specifications or user-specified via control specifications) and may be transitioned to being performed locally by the one or more content receivers 110 (e.g., router and/or endpoint computing device 116) when one or more of such thresholds are not satisfied by the detected bandwidth, latency, and/or processing times. When such metrics change and are determined to satisfy such thresholds, the operations may again be transitioned back to the cloud, with the one or more content receivers 110 sending the data (e.g., video data, audio data, text data, and/or metadata) to the backend system for processing. In various embodiments, as another example, such operations may be performed by default or transitioned to be performed by the router and/or television receiver when processing times at the endpoint computing device are determined by the subsystem 111 to not satisfy one or more processing thresholds. The router and/or television receiver may include one or more suitable processors and memory configured to handle such processing-intensive operations. In various embodiments, the subsystem 111 may hierarchically prioritize which types of data and/or processing is transitioned for performance locally versus in the cloud, and/or with one content receiver device versus another. Such hierarchical prioritization may be determined by the subsystem 111 as a function of detected metrics in comparison to thresholds for available bandwidth, latency, and/or processing times. As one example out of many possible examples, the subsystem 111 may prioritize performing audio and/or text processing locally rather than transmitting the audio and/or text data via the one or more networks 120 before transitioning video processing from the cloud to locally. Other embodiments are possible.

The content adaptation subsystem 111 may include or otherwise correspond to an audiovisual control engine. The content adaptation subsystem 111 may be communicatively coupled with interface components and communication channels (e.g., of the content receiver 110, which may take various forms in various embodiments as disclosed herein) configured to receive audiovisual content 202 and particularized control input 204. The one or more content harvesting engines 236 of the subsystem 111 may be configured to receive particularized control input 204 and/or audiovisual content 202 in order to facilitate content adaptation features disclosed herein. In some embodiments, the harvesting engine 236 may be configured to aggregate, pull, process, buffer, organize, rank, and/or store audiovisual content 202 and/or particularized control input 204. In various embodiments, the audiovisual content 202 may correspond to one or a combination of streaming data, packets of video, audio, textual and/or other data corresponding to online gaming data to facilitate an online gaming session, state data, message data, audio content, video content, audiovisual content, textual content, television channels, on-demand programing, online shared video content, social media content, on-demand or programmed movies and other shows, television programs or portions of television programs following and/or during a live broadcast of the television programs, advertising content and commercials, programming information (e.g., table data, electronic programming guide (EPG) content, etc.), other services, and/or the like. In various embodiments, the audiovisual content 202 may include audiovisual content broadcast and/or otherwise transmitted by the service provider system 102 and/or one or more other service providers 122, and/or one or more recordings of such content for later play-back. The various operations of the subsystem 111 corresponding to the matching, augmentation, and editing operations may be performed by the subsystem 111 as part of the ingestion of each audiovisual content 202 (e.g., movie, show, etc.). In some embodiments, the content adaptation system 200 may retain (e.g., cache, buffer, persistently store, archive, and/or the like) received audiovisual content 202 in one or more content adaptation repositories 176. The content adaptation repositories 176 may include any suitable form of storage media, such as any suitable form disclosed herein of storage media.

In various embodiments, the particularized control input 204 may indicate, include, and/or be used to develop particularized control specifications 210. The particularized control specifications 210 may govern monitoring operations and may include: specifications of devices, applications, and/or types of media to monitor, including identifiers of particular devices, applications, and/or types of media; specifications of users to monitor, including identifiers of particular users; specifications of trigger events disclosed further herein; specifications of adaptation protocols 212 that apply to particular devices, users, and/or trigger events; and/or the like. The particularized control input 204 and/or the particularized control specifications 210 may include: specifications of content composites for the subsystem 111 to detect in the data 202, and/or types and/or categories of content composites (e.g., violent content, sexual content, etc.); specifications of keywords, expressions, character strings, symbols, and/or the like (and/or types/categories thereof, such as profanity) which may be included in one or more text profiles 214 and which the subsystem 111 may detect as trigger events corresponding to one or more adaptation protocols 212; specifications of keywords, expressions, songs, sounds, voice characteristics, and/or the like (and/or types/categories thereof) which may be included in one or more audio profiles 216 and which the subsystem 111 may detect as trigger events corresponding to one or more adaptation protocols 212; specifications of people, characters, attributes of characters, types of characters, types of scenes, and types of actions, uniform resource identifiers, phone numbers, provider systems 102, text, logos, products, graphics, and/or the like which may be included in one or more video profiles 218 and which the subsystem 111 may detect as trigger events corresponding to one or more adaptation protocols 212; and/or the like. The control specifications 210 may include specifications of target ratings of content, such as MPAA ratings (e.g., G, PG, etc.), TV ratings (e.g., TV-Y, TV-Y7, etc.), and/or the like.

The control specifications 210 may be retained in any suitable form, such as files, lists, tables, indexes, key-value data structures, and/or the like, and may be keyed to, point to, link to, and/or otherwise reference particular adaptation protocols 212, text profiles 214, audio profiles 216, video profiles 218, rules 220, pattern data 222, and/or the like. Likewise, the adaptation protocols 212 may be retained in any suitable form, such as files, lists, tables, indexes, key-value data structures, and/or the like, and may be keyed to, point to, link to, and/or otherwise reference text profiles 214, audio profiles 216, video profiles 218, rules 220, pattern data 222, and/or the like. An adaptation protocol 212 may correspond to a particular set of one or more rules 220, text profiles 214, audio profiles 216, video profiles 218, pattern data 222, one or more user profiles, and/or the like with which the subsystem 111 may develop pursuant to the ongoing learning algorithms and features disclosed herein in conjunction with user-explicit specifications of preferences and customizations of the operations of the subsystem 111. In various embodiments, the adaptation protocol 212 and/or the particular set may correspond to one or a combination of objects, files, executable code segments, and/or the like which may be linked with pointers and/or other references in a decision tree data structure. Various embodiments of the adaptation protocols 212 may employ a protocol order, such as a decision tree, checklist, workflow, and/or the like.

The control specifications 210 may correspond to user input received via a device of the end-user network, such as an endpoint media device 116 and/or the content receiver 110. In various embodiments, the harvesting engine 236, the device 116, and/or the content receiver 110 may facilitate a user interface via the device 116 and/or the receiver 110 through which users may control and view settings of the subsystem 111 and view monitoring and control information and content. Accordingly, settings, information, and content may be displayed via the device 116 and/or the receiver 110 with the user interface, and interface elements of the user interface may allow for user input/selection to provide control specifications via the device 116 and/or the receiver 110. For example, parents or guardians may identify words, topics, content types, and/or content categories (e.g., profanity, violent content, sexual content, etc.) they want the subsystem 111 to use as triggers. They can also choose from preset lists designed for different user categories, such as pre-school age children, school-aged children, teenagers, ratings (e.g., G, TV-Y, etc.), and/or the like. They can choose from a variety of desired actions corresponding to editing operations 282 if inappropriate content (e.g., text, audio, video, metadata) is detected in audiovisual content 202 that may be received by the subsystem 111.

The control specifications 210 may include implicit specifications that the subsystem 111 infers from user presentation controls, such as fast-forwarding, skipping, rewinding and re-watching, skipping back and re-watching, corresponding DVR operations, and/or the like with respect to particular audiovisual content 202. The harvesting engine 236 may collect user presentation control data from the devices 116 and/or receivers 110. The matching engine 238 may map the user presentation control data to particular portions of particular audiovisual content 202 (e.g., particular shows, movies, televised events, etc.). For example, the subsystem 111 may identify what a particular user may skip or fast-forward in a particular show, say, a televised football game, where the user frequently skips or fast-forwards portions of the televised event between plays. In various embodiments, the devices 116 and/or receivers 110 may be configured to communicate user input corresponding to such specifications and/or user presentation control data to the harvesting engine 236. In various embodiments, the harvesting engine 236 may actively gather and/or pull such specifications and/or user presentation control data from the devices 116 and/or receivers 110 and/or the harvesting engine 236 may wait for updates pushed from the devices 116 and/or receivers 110. In some embodiments, the harvesting engine 236 may monitor the devices 116 and/or receivers 110, listening for signals, commands, and data corresponding to such specifications and/or user presentation control data.

Additionally, the control specifications 210 may correspond to collected specifications from users outside of the local network. Such crowd-sourced specifications may include specifications explicitly specified by user input 204. Additionally or alternatively, the subsystem 111 may infer crowd-sourced specification from user presentation controls, such as fast-forwarding, skipping, rewinding and re-watching, skipping back and re-watching, corresponding DVR operations, and/or the like with respect to particular audiovisual content 202. In various embodiments, crowd-sourced specifications may include one or a combination of: particularized control specifications 210 from one or more other subsystems 112; specifications of text, audio, and/or video corresponding to one or more text profiles 214, audio profiles 216, and/or video profiles 218 corresponding to trigger events for editing operations 282 from one or more other subsystems 112; specifications of editing operations 282 responsive to trigger events from one or more other subsystems 112; adaptation protocols 212 from one or more other subsystems 112 that may specify one or more user categories, corresponding text profiles 214, audio profiles 216, and/or video profiles 218, and corresponding editing operations 282 responsive to trigger events (e.g., for a particular age category, type of media, type of app, type of endpoint media device, geolocation, etc.); and/or the like.

In some embodiments, the devices 116 and/or receivers 110 may be configured to communicate user input corresponding to such specifications and/or user presentation control data to the service provider system 102. In so doing, the subsystems 112 may de-identify the corresponding data, obscure user identifiers, and/or create reporting/log data regarding the specifications that maintains the privacy of users from each local network. Accordingly, privacy of users may be maintained while aggregation and consolidation of the data may be performed by the service provider system 102. In various embodiments, the system 102 may actively gather and/or pull such data from the devices 116 and/or receivers 110. Additionally or alternatively, the system 102 may wait for updates from the devices 116 and/or receivers 110.

The consolidated control specifications 210 may form crowdsourced trends of trigger events and corresponding editing operations 282 for particular audiovisual content 202 (e.g., particular shows, movies, televised events, etc.) and/or for differentiated categories of users. Thus, for example, what most parents (e.g., simple majority, a plurality, or another suitable threshold of users as determined by the system 102) in a geographic region (e.g., corresponding to a block, neighborhood, street, ZIP Code, city, county, state, region, country, etc.) specify as objectionable content corresponding to a trigger event (e.g., specified via text profiles 214, audio profiles 216, video profiles 218, and/or the like) for a six-year-old may be identified based at least in part on the consolidated control specifications 210. Similarly, what most viewers in their 20s in the geographic region skip or fast-forward in a particular movie (e.g., slow, expansive scenes of landscapes, credits, melodramatic portions, etc.) may be identified based at least in part on the consolidated control specifications 210 and mapping with respect to particular portions of the movie. In some embodiments, the crowd-based control specifications may be utilized as default control specifications 210 for a particular local network in the geographic region. In some embodiments, such crowd-based control specifications may be an option for a user to opt into via the user interface. For example, the subsystem 111 may send notification to an authorized user via the user interface of an authorized endpoint media device 116, causing presentation of one or more interface options to allow the authorized user to opt in or ignore the notification, take other editing operations 282, and/or the like.

In various embodiments, the subsystem 111 may actively gather and/or pull crowd-based specifications and/or user presentation control data from the system 102 and/or the subsystem 111 may wait for updates pushed from the system 102. In such embodiments, the system 102 may perform the collecting and consolidating operations with respect to the specifications and/or user presentation control data for differentiated categories of users for a particular geographic region. The subsystem 111 may communicate to the system 102 identifications of the one or more user categories needed (e.g., age category, type of media, type of app, type of endpoint media device, etc.) and/or the geolocation of the endpoint media devices 116, and the system 102 may consolidate and select corresponding specifications for the identified one or more user categories and/or the geolocation to communicate to the subsystem 111. Additionally or alternatively, the subsystem 111 (e.g., with the harvesting engine 236 and a matching engine 238) may perform the collecting and consolidating operations 210 with respect to the control specifications and/or user presentation control data for differentiated categories of users for the particular geographic region. The subsystem 111 may then use the corresponding control specifications 210, adaptation protocols 212, text profiles 214, audio profiles 216, video profiles 218, and/or rules 220 for the one or more user categories and/or the geolocation identified by the subsystem 111.

The content adaptation subsystem 111 may include one or more matching engines 238 that may include logic to implement and/or otherwise facilitate any recognition, taxonomy, classification, categorization, correlation, mapping, qualification, scoring, organization, and/or the like features disclosed herein. In some embodiments, the matching engine 238 may be included in the harvesting engine 236; in some embodiments, the matching engine 238 may be separate from the harvesting engine 236 and, as disclosed above, may be included in other components of the subsystem 111 and/or in an upstream component such as the provider system 102. In various embodiments, the matching engine 238 may be configured to analyze, recognize, classify, categorize, characterize, tag, and/or annotate particularized control input 204 and/or audiovisual content 202. In some embodiments, the matching engine 238 may be, include, or otherwise correspond to a learning engine that may be an analysis engine that employs machine learning. The learning engine may further employ deep learning. Accordingly, the learning engine may facilitate machine learning or, more specifically, deep learning, to facilitate creation, development, and/or use of crowd-based control specifications, user presentation control data, interaction pattern data 222, particularized control specifications 210, and/or adaptation protocols 212. For example, based at least in part on taking into account received control specifications and/or user presentation control data from other subsystems (e.g., which may be included in the other content sources 112) as part of an ongoing feedback loop, the learning engine may employ an ongoing learning mode to develop crowd-based control specifications for particular audiovisual content 202 (shows, movies, televised events, etc.), user categories, types of media, applications, types of devices, and/or geographic regions, and to confirm, correct, and/or refine determinations made for crowd-based control specifications, user presentation control data, interaction pattern data 222, particularized control specifications 210, and/or adaptation protocols 212. The other subsystems may correspond to crowd-sources, such as other subsystems identified as being in the same geographic region (e.g., block, neighborhood, street, ZIP Code, city, county, state, region, country, etc.) as the subsystem 111. Additionally or alternatively, the other subsystems may correspond to crowd-sources that are identified as having associated users having characteristics (e.g., demographical data, viewing patterns, user categories, etc.) correlated to users of the subsystem 111 that have similar characteristics.

The subsystem 111 may be configured to employ machine learning to process the control input 204 and corresponding audiovisual content 202 to derive and develop the crowd-based control specifications, user presentation control data, interaction pattern data 222, particularized control specifications 210, and/or adaptation protocols 212. The subsystem 111 may be configured to employ deep learning to process the control input 204 and corresponding audiovisual content 202 to derive and develop the crowd-based control specifications, user presentation control data, interaction pattern data 222, particularized control specifications 210, and/or adaptation protocols 212. The learning engine may be configured to perform any one or combination of features directed to matching or otherwise correlating the control input 204 and corresponding audiovisual content 202.

The harvesting engine 236 may process the audiovisual content 202 as the audiovisual content 202 is received. For particular audiovisual content 202, the harvesting engine 236 may detect that an adaptation protocol 212 that applies to the audiovisual content 202 based at least in part on the particularized control specifications 210. The particularized control specifications 210 may include a destination specification and/or an endpoint specification, which the harvesting engine 236 may identify for the particular audiovisual content 202. Accordingly, the harvesting engine 236 may detect that an adaptation protocol 212 that applies to the audiovisual content 202 based at least in part on the identified destination specification and/or endpoint specification. For example, the particularized control specifications 210 may specify an adaptation protocol 212 that applies to the identifier of the endpoint media device 116, an identification of a user of the endpoint media device 116, and/or a time corresponding to when the particular audiovisual content 202 to be transmitted or otherwise made accessible to the endpoint device 116 and/or receiver 110 (e.g., a particular adaptation protocol 212 may apply to nighttime hours or other times of day, days of week, etc.). The harvesting engine 236 may identify the user using one or a combination of a user ID, login credentials, an assignment of the endpoint media device 116 and/or receiver 110 to the user, an account associated with the endpoint media device 116 and/or receiver 110, IP address of the endpoint media device 116 and/or receiver 110, MAC address of the endpoint media device 116 and/or receiver 110, facial recognition using one or more cameras communicatively coupled with the endpoint media device 116 and/or receiver 110, voice recognition using one or more microphones communicatively coupled with the endpoint media device 116 and/or receiver 110, and/or matching observations data of the user to tracking data that may correspond to chronicle of interactions, commands, content accesses, voice prints, and/or the like. The harvesting engine 236 may identify which criteria applies to the particular audiovisual content 202 and may match the criteria to the corresponding adaptation protocol 212.

Trigger events may be defined by the adaptation protocol 212, which may that specify criteria for when the detection of one or more content composites constitutes one or more trigger events. In some embodiments, detecting that a particular adaptation protocol 212 applies to the particular audiovisual content 202 may trigger initiating one or more listeners/agents to detect content composites based at least in part on a set of criteria that may indicate types of content composites to be intercepted. In some examples, content composites may be parsed to determine details about the content composites that fulfill the criteria. The harvesting engine 236, the matching engine 238, may determine, during streaming of the particular audiovisual content 202 (e.g., as the particular audiovisual content 202 is received in the audiovisual content 202 in real-time or near-real-time), whether the particular audiovisual content 202 includes a particular composite specified by the adaptation protocol 212. In various embodiments, the composite detection may include one or a combination of text recognition, image recognition, audio recognition, and/or pattern recognition, which may be specified by the adaptation protocol 212 (e.g., along with specifying which profiles are used for the monitoring). In some examples, the matching engine 238 may process and recognize text from text data for display by one or more applications with the audiovisual content 202, metadata (which may include closed captioning information), user identifiers, and/or the like of the audiovisual content 202 that maps to one or more text profiles 214 and/or reference keywords, expressions, character strings, symbols, and/or the like which may be included in the one or more text profiles 214 and may each have associated attributes and/or fields corresponding to whether it is flagged as prohibited, offensive, potentially objectionable, and/or the like. Accordingly, the subsystem 111 may utilize text profiles 214 as text-processing filters to facilitate various text-recognition features disclosed herein.

To facilitate audio recognition, the subsystem 111 (e.g., by way of the matching engine 238) may be configured to detect one or more audio characteristics in audiovisual content 202. The matching engine 238 may include an audio analyzer and handling module to facilitate that detection. By way of example, the matching engine 238 may detect one or more audio characteristics in audiovisual content 202 by way of any one or combination of analyzing audio, applying voice recognition, acoustic spectrum analysis, analyzing the audio tracks and/or metadata tracks, and/or the like of the audiovisual content 202 that maps to one or more audio profiles 216 and/or reference keywords, expressions, songs, sounds, voice characteristics, and/or the like which may be included in the one or more audio profiles 216 and may each have associated attributes and/or fields corresponding to whether it is flagged as prohibited, offensive, potentially objectionable, and/or the like. The subsystem 111 may utilize audio profiles 216 as audio-processing filters to facilitate various audio-recognition features disclosed herein. The subsystem 111 may, for example, recognize one or more keywords and/or expressions in the dialogue that the matching engine 238 may correlate to elements identified in an audio profile 216 corresponding to a selected adaptation protocol 212 for the purposes of characterizing the content and identifying content composites in the audiovisual content 202. Accordingly, in various embodiments, the correlation may be based at least in part on matching detected composites to identical and/or similar reference keywords, expressions, character strings, symbols, songs, sounds, voice characteristics, and/or the like specified in one or more text profiles 214 and/or audio profiles 216 corresponding to the selected adaptation protocol 212.

To facilitate image recognition, some embodiments of the harvesting engine 236, the matching engine 238, may determine may be configured to detect one or more color characteristics in the particular audiovisual content 202, which may include any suitable color characteristic that may be measured to recognize alpha and/or numerical portions of the images and/or objects in the images. The matching engine 238 may include an image analyzer and handling module to perform image analyses and facilitate that detection. By way of example, the matching engine 238 may detect one or more color characteristics in audiovisual content 202 by way of any one or combination of pixel identification, detecting color component values, detecting color codes, and/or the like. For example, from such portions and/or objects, the matching engine 238 may recognize people, characters, attributes of characters, types of characters, and types of actions (e.g., via facial recognition and/or pattern recognition/matching); uniform resource identifiers (e.g., URLs, web addresses, etc.); phone numbers; identifiers of provider systems 102; text and logos; products; graphics displayed with streaming tickers or overlays typically positioned and/or scrolling across a portion of the display area; and/or the like which the matching engine 238 may correlate, using any suitable facial or object trait qualifications for correlation, to one or more video profiles 218 and/or reference images which may be included in the one or more video profiles 218 and may each have associated attributes and/or fields corresponding to whether it is flagged as prohibited, offensive, potentially objectionable, and/or the like. Accordingly, the subsystem 111 may utilize video profiles 218 as audio-processing filters to facilitate various image-recognition and video-recognition features disclosed herein.

To facilitate the matching, the matching engine 238 may perform correlation based at least in part on the text recognition, image recognition, and/or audio recognition and text, image, and/or audio profiles 216 and/or reference data. By way of example, the correlation rules 220 may include correlation criteria that could include keywords identified by any one or combination of words, word stems, phrase, word groupings, and/or like keyword information. The correlation criteria could include weightings assigned to text, image, and/or audio specifications. Hence, within each bucket, a keyword could be assigned a weight according to its significance. More significant keywords could be assigned a greater weight than other common words that are not particularly significant. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision trees, with contingencies so that only certain combinations of characteristics and/or keywords may be considered. For example, certain characteristics and/or keywords could only have significance if used in conjunction with other characteristics and/or keywords, and/or not in conjunction with others. Similar correlation criteria may be used for other acoustic and image correlations.

In some embodiments, the matching engine 238 may employ a scoring system to quantify correlations with a numerical expression, for example, a match score, with higher scores being assigned to higher correlations. Higher scores may be assigned for greater extents of matching. As an example, an exact match of words, expressions, and/or dialogue categories may be assigned a higher score than a complimentary match (e.g., where absent an exact match, a word, expression, and/or word category is defined as a complement to another a word, expression, and/or word category). In some embodiments, the image recognition processes may yield an identification score. Any suitable identification scale may be used in various embodiments. In some embodiments, an identification scale could entail a scoring system. Some embodiments may score recognition of an individual, a character, one or more attributes of a character, a type of character, and a type of action displayed, etc. with a numerical expression, for example, an identification score. For example, in some embodiments, an identification score may be an assessment of a certainty with which the system identifies an individual, a character, one or more attributes of a character, a type of character, and a type of action displayed, etc. By way of example without limitation, an identification scale could include a range of identification scores from 0 to 100, or from 0 to 1,000, with the high end of the scale indicating greater probability. Some embodiments may use methods of statistical analysis to derive an identification score. Various embodiments may determine an identification score based on any one or more suitable quantifiers. An identification score may be based at least in part on the extent to which detected characteristics of the captured data match previously determined characteristics. With an identification score determined, categorizations may be made based on the score. By way of example without limitation, a score correlated to a 75-100% band may be deemed a positive identification; a score correlated to a 50-75% band may be deemed a possible identification; a score correlated to a 25-50% band may be deemed a weak identification; a score below a 50% minimum threshold may be deemed a weak/insufficient identification; and score of zero may correspond to an unknown aspect.

In various embodiments, the matching engine 238 may create and/or develop one or more text profiles 214, one or more audio profiles 216, and/or one or more video profiles 218 based at least in part on one or a combination of crowd-sourced specifications corresponding to presentation controls data, control specifications 210, adaptation protocols 212, text profiles 214, audio profiles 216, video profiles 218, and/or rules 220 from other subsystems 112; control input 204 received from one or more users of endpoint media devices 116 of the local network; ongoing learning by the subsystem 111 to develop, confirm, correct, and/or refine determinations with respect to the profiles (e.g., composites that should be monitored for as being triggers for prohibited content or content that is potentially prohibited or otherwise requires further editing operations) using control input 204 received from one or more users of endpoint media devices 116 of the local network and/or crowd-sourced specifications. Such control input 204 may include presentation controls data collected and identified by the subsystem 111 as inferred control input 204 learning by the subsystem 111 to develop, confirm, correct, and/or refine the determinations. The profiles may be retained in any suitable form, such as files, lists, tables, indexes, key-value data structures, and/or the like. In various embodiments, the one or more text profiles 214, one or more audio profiles 216, and/or one or more video profiles 218 may be available from a remote source and may be stored in data storage (e.g., content adaptation repositories 176).

The matching engine 238 may employ one or more artificial intelligence (machine learning or, more specifically, deep learning) algorithms to perform pattern matching to detect patterns of metrics of presentation controls and corresponding content characteristics observed in various types of instances where one or more users of the endpoint media devices 116 and/or content receivers 110 engaged with particular audiovisual content 202. Thus, the matching engine 238, which may include a learning engine, may be configured to perform pattern detection with respect to users, user characteristics (e.g., age, location, etc.), presentation controls with respect to particular audiovisual content 202, and the corresponding content characteristics, and develop interaction pattern data 222. The learning engine may facilitate machine learning or, more specifically, deep learning, to facilitate creation, development, and/or use of the interaction pattern data 222. The matching engine 238 may compile any one or combination of such data to create, based at least in part on machine-learning, pattern data 222 that may include pattern particulars to facilitate detection, recognition, and differentiation of patterns for individuals, their presentation controls with respect to particular audiovisual content 202 and types of audiovisual content 202, their particularized control input 204, their particularized control specifications 210, and correlations to other users have similar characteristics (e.g., demographical data, locations, etc.). The matching engine 238 may include a reasoning module to make logical inferences from a set of the detected and differentiated data to infer one or more patterns of identification data, presentation control data, device operation data, location data, temporal data, corresponding audiovisual content 202 characteristics, contextual data, and/or the like for individuals and aspects of the presentation controls detected. For instance, the pattern data may include information about any one or combination of identification histories, presentation control histories, device operation histories, location histories, temporal histories, content viewing histories, and/or the like, any set of which may be used to derive one or more of such patterns. A pattern-based reasoner could be employed to use various statistical techniques in analyzing the data in order to make inferences based on the analysis of the different types of pattern data 222, both current and historical. A transitive reasoner may be employed to infer relationships from a set of relationships related to different types of pattern data 222.

The subsystem 111 may include a control engine 242, which may be configured to cause one or more editing operations 282 in accordance with one or more adaptation protocols 212. For example, when the subsystem 111 detects that a particular adaptation protocol 212 applies to a particular audiovisual content 202 and that the particular audiovisual content 202 includes a particular composite specified by the adaptation protocol 212 (e.g., with one or more of the profiles associated with the adaptation protocol 212), the control engine 242 may cause one or more editing operations 282 to be performed in accordance with the adaptation protocol 212. Conventional systems and approaches are deficient in timeliness, adaptability, sensitivity, responsiveness, and facilitating content adaptation to endpoints at scale. The technical improvements provided by the subsystem 111 include improvements in timeliness, adaptability, sensitivity, responsiveness, and machine control for content adaptation to endpoints at scale based at least in part on adaptive machine-based control that causes editing operations 282.

In some embodiments, the control engine 242 may include a multiplexer. The editing operations 282 may include content modifications 282-1 to modify a portion of the content corresponding to the detected composite. As disclosed herein, the control engine 242 may buffer and/or cache the audiovisual content 202, which may allow for on-the-fly, real-time or near real-time content modifications 282-1 to change portions of the data that correspond to the detected composite. The control engine 242 may cache, buffer, and/or otherwise store the audiovisual content 202 (e.g., in cache or storage repositories 176) to facilitate the content editing/modifying/splicing, augmentation, and/or the like features disclosed herein.

The editing operations 282 may include metadata augmentation 282-3. In some embodiments, the content adaptation subsystem 111 may be configured to insert metadata into the particular audiovisual content 202 to mark portions of the audiovisual content 202 for editing operations 282 (e.g., skipping, bleeping, blanking, replacement, pixilation, splicing, and/or other content modifications disclosed herein) by the control engine 242, endpoint media device 116, and/or content receiver 110. Some embodiments may include a metadata augmentation engine 240 to facilitate such features. The metadata augmentation engine 240, as with some embodiments of the other engines, may include instructions retained in a computer-readable media and to be executed by one or more processors.

Figure 3:
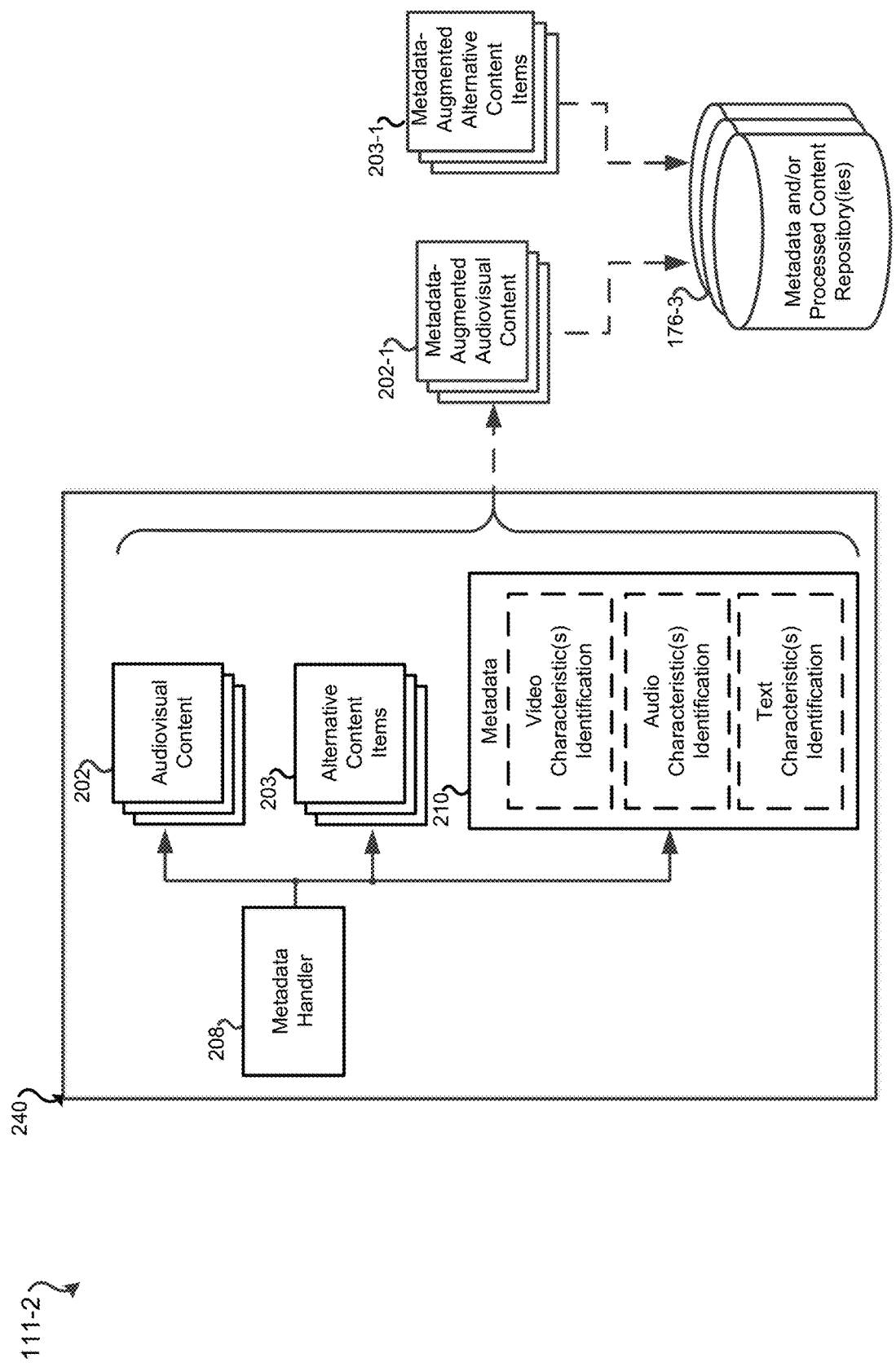
FIG. 3 illustrates a portion of the content adaptation subsystem with metadata augmentation features, in accordance with disclosed embodiments according to the present disclosure.

FIG. 3 is an illustration of a portion of the content adaptation subsystem 111-2 with metadata augmentation features, in accordance with certain embodiments according to the present disclosure. While not all components of subsystem 111-1 are shown in FIG. 3, the subsystem 111-2 may include one or a combination of such components. As disclosed above, the content matching engine 238 may identify one or more characteristics and/or categories of the particularized content 202. Based at least in part on such identification, the metadata augmentation engine 240 may create metadata 208, which, in some embodiments, may correspond to tag data and/or markers. Hence, the metadata augmentation engine 240 may process audiovisual content 202 and provide tagged audiovisual content 202-1.

The metadata augmentation engine 240 may include a metadata handler 208 that may generate metadata 210 (e.g., one or more tags 210) corresponding to the characteristics and/or categories. In some embodiments, the metadata 210 may be inserted into the output audiovisual content 202. In some embodiments, the one or more tags 210 may not be inserted into the audiovisual content 202 but may be sent with the output audiovisual content 202. For example, metadata augmentation engine 240 may assign packet identifiers to identify data of the content that is to be transmitted as part of a data stream to the endpoint media device 116 and/or content receiver 110 and that is to be associated with one or more tags. In any case, the subsystem 111-2 may output metadata-augmented audiovisual content 202-1. In some embodiments, the metadata-augmented audiovisual content 202-1 may be stored at least temporarily in one or more repositories 176. In some embodiments, tag data may be stored at least temporarily in one or more repositories 176. Data transmitted as part of a data stream to the endpoint media device 116 and/or content receiver 110 may be packetized and assigned packet identifiers. A particular packet identifier may be associated with data packets related to tags for particular segments of metadata-augmented audiovisual content 202-1.

Tag data may include an indication of a period of time (or other measure of time, e.g., a number of frames), a start frame, an end frame, and/or the like. Tag data may include or otherwise be associated with a tag identifier and may include characteristic and/or category identifiers. For example, tag data may include any one or combination of color characteristic and/or category identifiers, acoustic characteristic and/or category identifiers, dialogue characteristic and/or category identifiers, and/or the like. Tag data may include one or more indications of the following aspects of the audiovisual content 202. The control engine 242 may identify one or more portions of the audio, video, and/or text particular audiovisual content 202 that correspond to the detected composite and that may be used by the control engine 242 as one or more transition points (e.g., boundaries, beginning, end, etc.), hooks, frames, windows, and/or the like for the content modifications 282-1. In various embodiments, the control engine 242 may identify the one or more portions by way of one or combination of pixel identification, detecting color component values, detecting color codes, detecting acoustic characteristics such as frequencies, intensities, tones, pitches, and/or the like audio metrics as distinctive markings; optical character recognition; and/or the like. In some embodiments, a processor (such as a main processor, a core processor, digital signal processor, and/or like) may define the portions of the video with respect to one or more reference frames and may perform auto-correlation of related images in the video stream to identify/define the areas in other frames of the video sequence that represent the portion to be changed. Image characteristics (e.g., color, brightness, contrast, color temperature, tint, shade, colorfulness, chroma, intensity, saturation, and/or any suitable color characteristic for a video sequence that may be measured) of the area of interest with respect to the reference frame(s) could be measured, quantified, and/or otherwise identified, and matched with measured image characteristics of the other frames to define the area to be changed in multiple frames in an image-changing sequence. Accordingly, some embodiments may allow for handling the complexity of multiple on-screen options by differentiating particular areas in dynamic, image-changing content. In various embodiments, the control engine 242 may analyze the metadata for the particular audiovisual content 202 to facilitate identification of the transition points, hooks, frames, windows, and/or other portions for the content modifications 282-1.

In various embodiments, the audio, video, and/or text corresponding to the detected composite may be excised, blended, obscured, blurred, pixelated, cropped out, skipped, and/or otherwise altered through audio, video, and/or text editing by the control engine 242 so that the original detected composite is no longer presented with the rest of the particular audiovisual content 202 as the control engine 242 allows the modified particular audiovisual content 202 to exit buffering and be presented with the endpoint media device 116 or display device 160, and/or be transferred to the endpoint media device 116 or content receiver 110. Additionally or alternatively, in various embodiments, the audio, video, and/or text corresponding to the detected composite may be replaced, overlaid, overwritten, merged, blended, joined, and/or otherwise altered with alternative audio, video, and/or text content 203 so that the original detected composite is no longer presented with the rest of the particular audiovisual content 202 as the control engine 242 allows the modified particular audiovisual content 202 to exit buffering and be presented with the endpoint media device 116 or display device 160, and/or be transferred to the endpoint media device 116 or content receiver 110. The alternative content items 203 may, for example, include audio bleeps, alternative words in textual form, alternative words in audio form, alternative words in video/image form, dead space, alternative graphics/images, alternative sounds/music, and/or the like, which may also be transferred to the endpoint media device 116 and/or content receiver 110 for use in subsequent editing in some embodiments. Such alternative content items 203 may likewise be augmented with tag data to facilitate the editing operations 282 matched with the particular portions of the audiovisual content 202 for which the alternative content items 203 are to be used.

In various embodiments, the audio, video, and/or text corresponding to the original detected composite may be formatted, rescaled, cropped, image characteristic (e.g., color, brightness, transparency, opaqueness, contrast, etc.) adjusted, and/or otherwise prepared to facilitate the changes by the control engine 242 and subsequent presentation by the endpoint media device 116 and/or display device 160. In various embodiments, the modifications 282-1 may include one or a combination of: turning off, terminating, and/or closing a pertinent application; closing a presentation window or frame through which is content is being presented; pausing execution of a pertinent application; closing or disabling a chat box/functionality; muting or otherwise disabling audio; pausing content presentation; and/or the like. In various embodiments, the applicable control specifications 210 and/or adaptation protocol 212 may specify the particular subset of modifications 282-1 to be executed for a given endpoint media device 116, application, user, type of content composite detected, and audiovisual content 202.

Referring again to FIG. 2, the editing operations 282 may include providing notifications 282-3 automatically as a function of detecting a composite corresponding to a trigger event. In some embodiments, the provisioning of content may include providing a notification to an endpoint media device 116, content receiver 110, and/or display device 160 corresponding to an authorized user, the notification 282-3 (e.g., push notifications, modal window, pop-up, email, text message, SMS message, iMessage, and/or the like) may indicate options to edit the audiovisual content 202 corresponding to the detected composite and/or access one or more edited versions of the audiovisual content 202. In some examples, a push notification 282-3 may be sent to a mobile app of the endpoint media device 116, content receiver 110, and/or display device 160 of the authorized user to cause a pop-up notification 282-3 on the endpoint media device 116, content receiver 110, and/or display device 160. Consequent to selection of the notification 282-3, other security operations 282 may be executed.

In some embodiments, the multiplexer may select one or more portions of the content surrounding detected content composite that corresponds to a trigger event and/or may potentially correspond to a trigger event to provide to one or more authorized users via an application of one or more endpoint media devices 116 as one or more examples of content that could be edited in accordance with user selections. In various examples, the detected composite, whether it includes text, audio, and/or video, may be selected, as well as a portion prior to the detected composite and/or a portion subsequent to the detected composite. The selected portions may be stored, at least temporarily, for consequent provisioning to an authorized user. The selected portions may be provisioned as a report in some embodiments. In some embodiments, the control engine 242 may compile the one or more keywords, expressions, character strings, symbols, songs, sounds, voice characteristics, and/or the like detected by the matching engine 238 as matching one or more elements in one or more of the profiles and may retain the detected composites in a file to report them via an user interface of the one or more of the endpoint media devices 116 as a textual impression, audio impression, and/or video impression to be accessed after the trigger event.

In various embodiments, selectable interface options may be presented to allow the authorized user to provide particularized control input 204 and/or the particularized control specifications 210 (which may be in addition to that with the authorized user previously provided). By way of example, the selectable interface options may allow for the authorized user to: select access to original, unmodified audiovisual content 202; modify specifications of trigger events (e.g., approve, reject, delete/remove, etc. specifications of trigger events); modify specifications of adaptation protocols 212 that apply to particular devices, users, and/or trigger events; specify content composites for the subsystem 111 to detect in the data 202, and/or types and/or categories of content composites; specify keywords, expressions, character strings, symbols, and/or the like (and/or types/categories thereof, such as profanity) which may be included in one or more text profiles 214 and which the subsystem 111 may detect as trigger events corresponding to one or more adaptation protocols 212; specify keywords, expressions, songs, sounds, voice characteristics, and/or the like (and/or types/categories thereof) which may be included in one or more audio profiles 216 and which the subsystem 111 may detect as trigger events corresponding to one or more adaptation protocols 212; specify people (e.g., actors, users, etc.), characters, attributes of characters, types of characters, types of scenes, and types of actions, uniform resource identifiers, phone numbers, provider systems 102, text, logos, products, graphics, and/or the like which may be included in one or more video profiles 218 and which the subsystem 111 may detect as trigger events corresponding to one or more adaptation protocols 212; specify target ratings of content, such as MPAA ratings (e.g., G, PG, etc.), TV ratings (e.g., TV-Y, TV-Y7, etc.), and/or the like which may govern the editing operations 282 such that the subsystem 111 may edit the audiovisual content 202 to remove, replace, or otherwise edit so that the edited audiovisual content 202 satisfies criteria and conforms to the target ratings; and/or the like.

Consequent to selection of one or more of the interface options, the subsystem 111 may execute the editing operations 282 in accordance with the user selections on currently received audiovisual content 202 and/or audiovisual content 202 received in the future and provide access to the edited audiovisual content 202 to the endpoint media device 116 and/or content receiver 110. Thus, for example, the edited audiovisual content 202 may be transmitted or otherwise transferred from the control engine 242 to the endpoint media device 116 and/or content receiver 110. In some instances, this may include transmitting or otherwise transferring edited audiovisual content 202 that corresponds to part of the content 202 (e.g., a first portion) to the endpoint media device 116 and/or content receiver 110 while the editing operations 282 continue on at least part of the balance of the content 202, which may be sent after it has been edited.

The editing operations 282 may include crowd-based editing operations 282-4 that may correspond to any editing operations 282 performed based at least in part on the crowd-based features disclosed herein. For example, from the crowd-based control specifications 210, the subsystem 111 may automatically utilize a crowd-based trigger, detect a corresponding trigger event, and send one or more notifications to the endpoint media device 116 of an authorized user with interface options to accept or reject one or more editing operations 282. If the authorized user does not respond within X amount of time, the subsystem 111 may automatically execute one or more editing operations 282 in accordance with the crowd-based operations. In some instances, an authorized user may have already opted in to crowd-based editing operations 282-4, and, accordingly, the subsystem 111 may automatically execute one or more editing operations 282 in accordance with the crowd-based operations. This may include monitoring for crowd-based triggers (as well as any previously defined, default, or customized triggers) and executing the crowd-based editing operations 282-4 or suitable alternative editing operations 282. Such editing operations 282 may be the same editing operations 282 that a majority or a plurality of the geo-relevant and category-relevant crowd applies or suitable alternative editing operations 282, that may be specified by the authorized user.

With subsystem 111 determinations and editing operations 282 disclosed herein, such determinations and editing operations 282 may be automatically effected herein, the subsystem 111 may employ ongoing learning processes that process feedback consequent to execution of the editing operations 282. When one or more editing operations 282 are corrected by an authorized user either explicitly via particularized control input 204 or implicitly (e.g., by ignoring or rejecting security notifications, accepting or rejecting proposed editing operations 282, etc. via selectable options of the user interface of an endpoint media device 116 and/or content receiver 110 of an authorized user), the matching engine 338 may adapt to the feedback. Accordingly, the subsystem 111 may learn acceptable triggers and editing operations 282 via subsequent adjustments and adapt the control specifications 210, adaptation protocols 212, profiles, rules 220, and/or pattern data 222 and automatic editing operations 282 based at least in part on the learning. The control specifications 210, adaptation protocols 212, profiles, rules 220, and/or pattern data 222 may include user models/profiles that may include learned and inferred conclusions regarding particular identified users, user pattern data 222 adapted and tuned to particular users and corresponding situations with the feedback data (e.g., user approval or rejection of editing operations 282 and/or corresponding flagged content). The matching engine 238 may facilitate machine learning or, more specifically, deep learning, to facilitate creation, development, and/or use of user pattern data 222 in order to adapt and tune control specifications 210, adaptation protocols 212, profiles, and/or rules 220 to particular users and households.

As disclosed herein, various embodiments of the adaptation protocols 212 may employ a protocol order, such as a decision tree, checklist, workflow, and/or the like. In various embodiments, different editing operations 282 may be executed based on the certainty of the identification of a trigger event and/or user. For example, in the cases of a possible or weak identification of potentially concerning event (e.g., potentially offensive content), the subsystem 111 may present one or more options to the authorized user to elicit user confirmation or rejection of the trigger event and/or proposed one or more editing operations 282. In the case of a positive identification, the subsystem 111 may proceed with one or more editing operations 282 without confirmation and may send such notifications with options to confirm or override the one or more editing operations 282 and confirm or reject the event recognized as a trigger. Accordingly, the subsystem 111 may employ a gradated scale of identification/certitude and corresponding editing operations 282 taken. Additionally or alternatively, in various embodiments, the subsystem 111 may employ a gradated scale of the gravity of the recognized trigger event and corresponding editing operations 282 taken. For example, for relatively less grave triggers, the editing operations 282 automatically selected and employed by the subsystem 111 may be minimal (e.g., notifications with options to approve/disapprove). For more grave triggers, the editing operations 282 automatically selected and employed by the subsystem 111 may involve a greater extent of interventions (e.g., censoring/bleeping or other content modifications).

Figure 4:
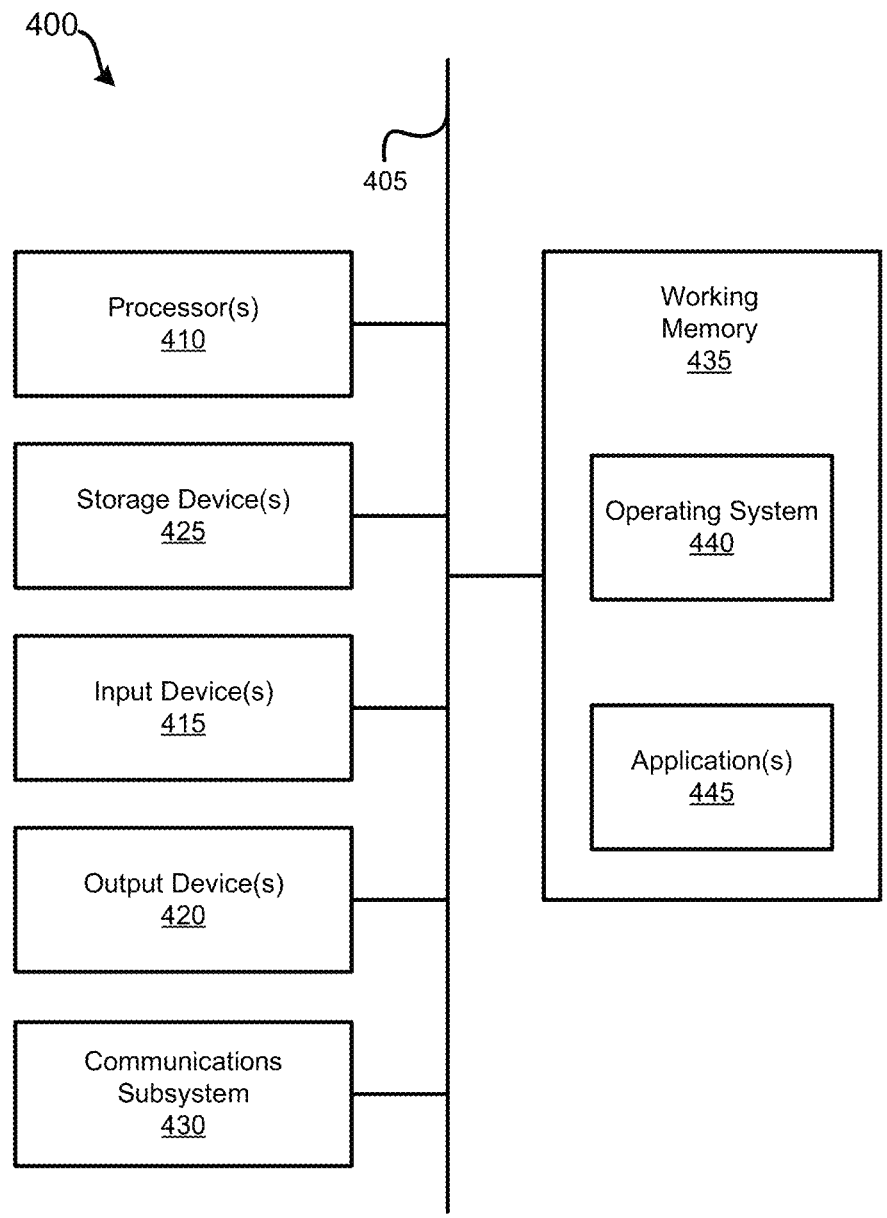
FIG. 4 illustrates a computer system, in accordance with disclosed embodiments according to the present disclosure.

A computer system as illustrated in FIG. 4 may be at least partially incorporated as part of one or a combination of the previously described computerized devices, such as devices 110, 116, and/or service provider system 102. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, video decoders, and/or the like); one or more input devices 415, which can include without limitation a mouse, a keyboard, remote control, and/or the like; and one or more output devices 420, which can include without limitation a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate content adaptation to endpoints, the system comprising:
   one or more processing devices; and
   memory communicatively coupled with and readable by the one or more processing devices and having stored therein processor-readable instructions which, when executed by the one or more processing devices, cause the one or more processing devices to perform operations comprising:
      receiving first content that comprises audio content and video content;
      detecting that an adaptation protocol applies to the first content based at least in part on one or more of a destination specification and/or an endpoint specification identified for the first content;
      analyzing the first content based at least in part on the adaptation protocol;
      determining that a portion of the first content has a content characteristic specified by the adaptation protocol;
      identifying a set of rules governing content modification in accordance with the adaptation protocol;
      modifying the first content in accordance with the adaptation protocol and the set of rules based at least in part on crowdsourced data from a plurality of content receivers, where the crowdsourced data is indicative of selections of a plurality of different editing operations with respect to content that is different from the first content, and the modifying comprises matching a subset of one or more editing operations of the plurality of different editing operations that are determined from the crowdsourced data to have been selected by a majority or a plurality of a crowd that is geo-relevant and category-relevant to one or more users associated with an endpoint media device and performing the one or more editing operations with respect to the first content;
      transferring the modified first content so that the modified first content is accessible with the endpoint media device;
      receiving an indication of one or more user adjustments to the one or more editing operations performed with respect to the first content, wherein the one or more user adjustments correspond to one or more selections of user-selectable options associated with the one or more editing operations and the endpoint media device;
      learning triggers and editing operations acceptable to a particular user of the endpoint media device based at least in part on the one or more user adjustments made with the endpoint media device; and
      modifying second content for the endpoint media device based at least in part on the learned triggers and editing operations acceptable to the particular user of the endpoint media device.

2. The system to facilitate content adaptation to endpoints as recited in claim 1, where the modifying the first content comprises editing a video portion of the first content that corresponds to the portion of the first content that has the content characteristic.

3. The system to facilitate content adaptation to endpoints as recited in claim 1, where the modifying the first content comprises editing an audio portion of the first content that corresponds to the portion of the first content that has the content characteristic.

4. The system to facilitate content adaptation to endpoints as recited in claim 1, where the modifying the first content comprises adding tag data corresponding to the portion of the first content that has the content characteristic.

5. The system to facilitate content adaptation to endpoints as recited in claim 1, where the modifying the first content in accordance with the adaptation protocol and the set of rules is based at least in part on control specifications received via a user interface associated with the endpoint media device.

6. The system to facilitate content adaptation to endpoints as recited in claim 1, the operations further comprising:
   collecting the crowdsourced data from the plurality of content receivers;
   where the crowdsourced data is indicative of one or more playback control operations made with each content receiver of the plurality of content receivers.

7. One or more non-transitory, machine-readable media having machine-readable instructions thereon which, when executed by one or more processing devices, cause the one or more processing devices to perform operations comprising:
- receiving first content that comprises audio content and video content;
- detecting that an adaptation protocol applies to the first content based at least in part on one or more of a destination specification and/or an endpoint specification identified for the first content;
- analyzing the first content based at least in part on the adaptation protocol;
- determining that a portion of the first content has a content characteristic specified by the adaptation protocol;
- identifying a set of rules governing content modification in accordance with the adaptation protocol;
- modifying the first content in accordance with the adaptation protocol and the set of rules based at least in part on crowdsourced data from a plurality of content receivers, where the crowdsourced data is indicative of selections of a plurality of different editing operations with respect to content that is different from the first content, and the modifying comprises matching a subset of one or more editing operations of the plurality of different editing operations that are determined from the crowdsourced data to have been selected by a majority or a plurality of a crowd that is geo-relevant and category-relevant to one or more users associated with an endpoint media device and performing the one or more editing operations with respect to the first content;
- transferring the modified first content so that the modified first content is accessible with the endpoint media device;
- receiving an indication of one or more user adjustments to the one or more editing operations performed with respect to the first content, wherein the one or more user adjustments correspond to one or more selections of user-selectable options associated with the one or more editing operations and the endpoint media device;
- learning triggers and editing operations acceptable to a particular user of the endpoint media device based at least in part on the one or more user adjustments made with the endpoint media device; and
- modifying second content for the endpoint media device based at least in part on the learned triggers and editing operations acceptable to the particular user of the endpoint media device.

8. The one or more non-transitory, machine-readable media as recited in claim 7, where the modifying the first content comprises editing a video portion of the first content that corresponds to the portion of the first content that has the content characteristic.

9. The one or more non-transitory, machine-readable media as recited in claim 7, where the modifying the first content comprises editing an audio portion of the first content that corresponds to the portion of the first content that has the content characteristic.

10. The one or more non-transitory, machine-readable media as recited in claim 7, where the modifying the first content comprises adding tag data corresponding to the portion of the first content that has the content characteristic.

11. The one or more non-transitory, machine-readable media as recited in claim 7, where the modifying the first content in accordance with the adaptation protocol and the set of rules is based at least in part on control specifications received via a user interface associated with the endpoint media device.

12. The one or more non-transitory, machine-readable media as recited in claim 7, the operations further comprising:
- collecting the crowdsourced data from the plurality of content receivers;
- where the crowdsourced data is indicative of one or more playback control operations made with each content receiver of the plurality of content receivers.

13. A method to facilitate content adaptation to endpoints, the method comprising:
- receiving first content that comprises audio content and video content;
- detecting that an adaptation protocol applies to the first content based at least in part on one or more of a destination specification and/or an endpoint specification identified for the first content;
- analyzing the first content based at least in part on the adaptation protocol;
- determining that a portion of the first content has a content characteristic specified by the adaptation protocol;
- identifying a set of rules governing content modification in accordance with the adaptation protocol;
- modifying the first content in accordance with the adaptation protocol and the set of rules based at least in part on crowdsourced data from a plurality of content receivers, where the crowdsourced data is indicative of selections of a plurality of different editing operations with respect to content that is different from the first content, and the modifying comprises matching a subset of one or more editing operations of the plurality of different editing operations that are determined from the crowdsourced data to have been selected by a majority or a plurality of a crowd that is geo-relevant and category-relevant to one or more users associated with an endpoint media device and performing the one or more editing operations with respect to the first content;
- transferring the modified first content so that the modified first content is accessible with the endpoint media device;
- receiving an indication of one or more user adjustments to the one or more editing operations performed with respect to the first content, wherein the one or more user adjustments correspond to one or more selections of user-selectable options associated with the one or more editing operations and the endpoint media device;
- learning triggers and editing operations acceptable to a particular user of the endpoint media device based at least in part on the one or more user adjustments made with the endpoint media device; and
- modifying second content for the endpoint media device based at least in part on the learned triggers and editing operations acceptable to the particular user of the endpoint media device.

14. The method to facilitate content adaptation to endpoints as recited in claim 13, where the modifying the first content comprises editing a video portion of the first content that corresponds to the portion of the first content that has the content characteristic.

15. The method to facilitate content adaptation to endpoints as recited in claim 13, where the modifying the first content comprises editing an audio portion of the first content that corresponds to the portion of the first content that has the content characteristic.

16. The method to facilitate content adaptation to endpoints as recited in claim 13, where the modifying the first content comprises adding tag data corresponding to the portion of the first content that has the content characteristic.

17. The method to facilitate content adaptation to endpoints as recited in claim 13, where the modifying the first content in accordance with the adaptation protocol and the set of rules is based at least in part on control specifications received via a user interface associated with the endpoint media device.

* * * * *